(12) United States Patent
Gooch

(10) Patent No.: US 6,466,325 B1
(45) Date of Patent: Oct. 15, 2002

(54) METHOD AND APPARATUS FOR CALIBRATING POSITIONS OF A PLURALITY OF FIRST LIGHT SOURCES ON A FIRST PART

(75) Inventor: Richard M Gooch, Surbiton (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/600,998

(22) PCT Filed: Jun. 29, 2000

(86) PCT No.: PCT/GB00/02526

§ 371 (c)(1),
(2), (4) Date: Jul. 26, 2000

(87) PCT Pub. No.: WO01/04570

PCT Pub. Date: Jan. 18, 2001

(30) Foreign Application Priority Data

Jul. 8, 1999 (GB) .............................................. 9915882

(51) Int. Cl.⁷ .......................... G01B 11/14; G01B 11/24
(52) U.S. Cl. ....................................... 356/620; 356/601
(58) Field of Search ................................ 356/620, 622, 356/623, 614, 601, 602

(56) References Cited

U.S. PATENT DOCUMENTS

| | | | |
|---|---|---|---|
| 5,267,143 A | | 11/1993 | Pryor |
| 5,440,392 A | * | 8/1995 | Pettersen et al. ........... 356/601 |
| 5,446,548 A | | 8/1995 | Gerig et al. |
| 5,884,239 A | * | 3/1999 | Romanik, Jr. ................ 345/158 |
| 5,973,788 A | * | 10/1999 | Pettersen et al. ........... 356/614 |
| 6,175,647 B1 | * | 1/2001 | Schick et al. ................ 382/152 |
| 6,301,549 B1 | * | 10/2001 | Barney ................... 250/559.22 |

* cited by examiner

Primary Examiner—Frank G. Font
Assistant Examiner—Roy M. Punnoose
(74) Attorney, Agent, or Firm—Nixon & Vanderhye P.C.

(57) ABSTRACT

A method for calibrating position (11) of each light source in a first set of light sources (1) on a first part (2) when the first set (1) are attached thereto, including the steps of measuring first positions ($3_i$) of each of the light sources in the first set (1), each of said light sources (1) being either an active light source or an illuminable reflecting point, generating a first set of light sources to facet mapping (4), which first set to facet mapping (4) specifies which facet ($9_j$) of the first part (2) each of the light sources in the first set (1) are located on, estimating a transformation (5) that transforms the first positions ($3_i$) into a co-ordinate frame of the first part (7), thereby generating estimated positions ($6_i$) of each of the light sources in the first set (1) on the first part (2), which estimated positions ($6_i$) are in the co-ordinate frame of the first part (7), calculating (10a) first distances ($8_i$) from the estimated positions ($6_i$) to respective facets ($9_j$) of the first part (2), inputting the first distances ($6_i$) into a least mean squares (LMS) error function (10b) so as to generate a plurality of errors, and optimising said errors so as to locate the positions (11) of said first set of light sources on the first part.

10 Claims, 3 Drawing Sheets

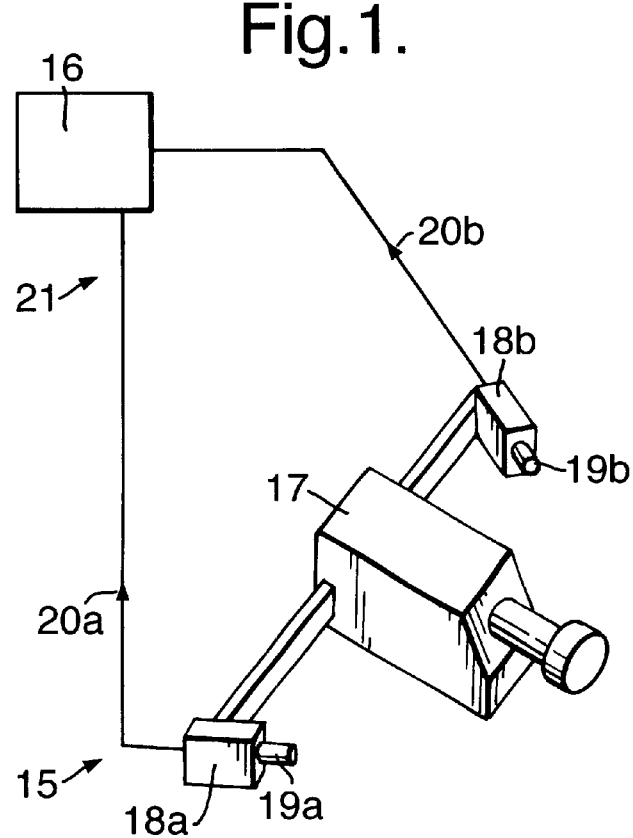
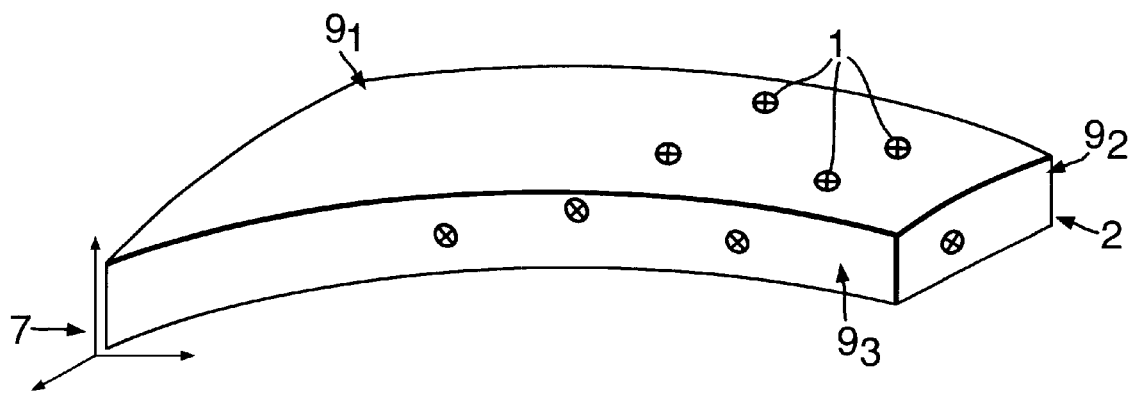

METHOD AND APPARATUS FOR CALIBRATING POSITIONS OF A PLURALITY OF FIRST LIGHT SOURCES ON A FIRST PART

BACKGROUND OF THE INVENTION

1. Field of the Invention

This invention relates to a method and apparatus for calibrating positions of a plurality of first light sources on a first part when the first light sources are attached thereto, particularly, but not exclusively suitable for robotic parts handling and working.

2. Discussion of Prior Art

In any system involving automated movement of parts where the movement is controlled by an external sensor system, optical targets used to sense the position and orientation of parts are usually fixed thereto at known locations on the part—i.e. at known locations in the co-ordinate system of the part. However, this assumes that the targets can be fixed to the part extremely accurately, and this is often difficult to achieve in practice, particularly if the part is transferred between different environments and conditions. In the majority of robotic applications that use photogrammetry as its external sensor system, the assumption of known positions of the photogrammetric targets on the part underpins the majority of the subsequent calculations, and thus any discrepancies can result in inaccurate positioning and/or working of the part.

In this specification, the external surface of the part upon which targets are affixed is referred to as a facet, and this term includes curved and flat external surfaces of the part.

There is therefore a need for a generally improved method and apparatus for calibrating positions of a plurality of first light sources on a part that does not require positioning the optical targets at known locations in the coordinate frame of the part.

SUMMARY OF THE INVENTION

According to a first aspect of the present invention there is provided a method for calibrating positions of a plurality of first light sources on a first part when the first light sources are attached thereto, including the steps of measuring first positions of the plurality of first light sources, each of which first light sources is either an active light source or an illuminable reflecting point and matching the first positions to a data file geometrically describing the first part.

Preferably matching the first positions to a data file includes generating a first light source to facet mapping, which first light source to facet mapping specifies which facet of the first part the first light sources are located on, estimating a transformation that transforms the first positions into a co-ordinate frame of the first part, thereby generating estimated positions of the first light sources on the first part, which estimated positions are in the co-ordinate frame of the first part, calculating first distances from the estimated positions to respective facets of the first part, inputting the first distances into a least mean squares (LMS) error function so as to generate a plurality of errors, and optimising said errors so as to locate the positions of said plurality of first light sources on the first part.

Conveniently each of the first distances corresponding to each of the plurality of first light sources is given by taking an intersection between a vector normal to the local surface of the corresponding facet and the estimated position, which vector normal is derivable from a first data file containing a geometric definition of the first part.

According to a further aspect of the present invention there is provided apparatus for calibrating positions of a plurality of first light sources on a first part when the first light sources are attached thereto, including measurement means operable to measure first positions of the plurality of first light sources, mapping means for generating a first light source to facet mapping, transformation means for transforming the first positions onto the first part, a first data file stored on a computer readable disk, which first data file provides a geometric definition of the first part, and a processor for processing first positions measured by the measurement means and for manipulating the same in conjunction with the mapping means, the transformation means and the first data file, so as to calibrate the positions of plurality of first light sources on a first part when said first light sources are attached thereto.

Preferably the measurement means includes an end-effector, at least two imaging devices, each attachable to the end-effector and each configurable to image all facets of the first part, at least two second light sources, each associated with a respective imaging device, and communication links between the imaging devices and the processor for transmitting output signals indicative of the first positions.

Conveniently each of the imaging devices is a metrology sensor operable to create digitisable images.

Advantageously each of the plurality of first light sources is a reflective target.

Preferably there is at least six first light sources positioned on three different facets of the first part.

Conveniently the communication links include coaxial cables and framegrabber ports.

Advantageously the first data file is a Computer Aided Design (CAD) model of the first part.

BRIEF DESCRIPTION OF THE DRAWINGS

For a better understanding of the present invention, and to show how the same may be carried into effect, reference will now be made, by way of example, to the accompanying drawings, in which:

FIG. 1 is a schematic perspective representation of apparatus used to calibrate positions of a plurality of first light sources on a first part according to the present invention.

DETAILED DISCUSSION OF EMBODIMENTS

A method for calibrating positions of a plurality of first light sources on a first part according to the present invention is intended for use in situations where the positions of the first light sources are not known, or are known only approximately, relative to the geometry of the first part. The method is therefore well suited to a variety of automated tasks, particularly the measurement of parts for robotic parts handling and working.

In the following description, various method steps are discussed with reference to each of the first light sources 1. The parameters of interest are thus defined using subscript i to indicate a single first light source. Similarly, the first part 2 is discussed in terms of its facets, $9_j$, and the subscript j here distinguishes a single facet from the plurality thereof comprising the first part 2.

Figure 2:
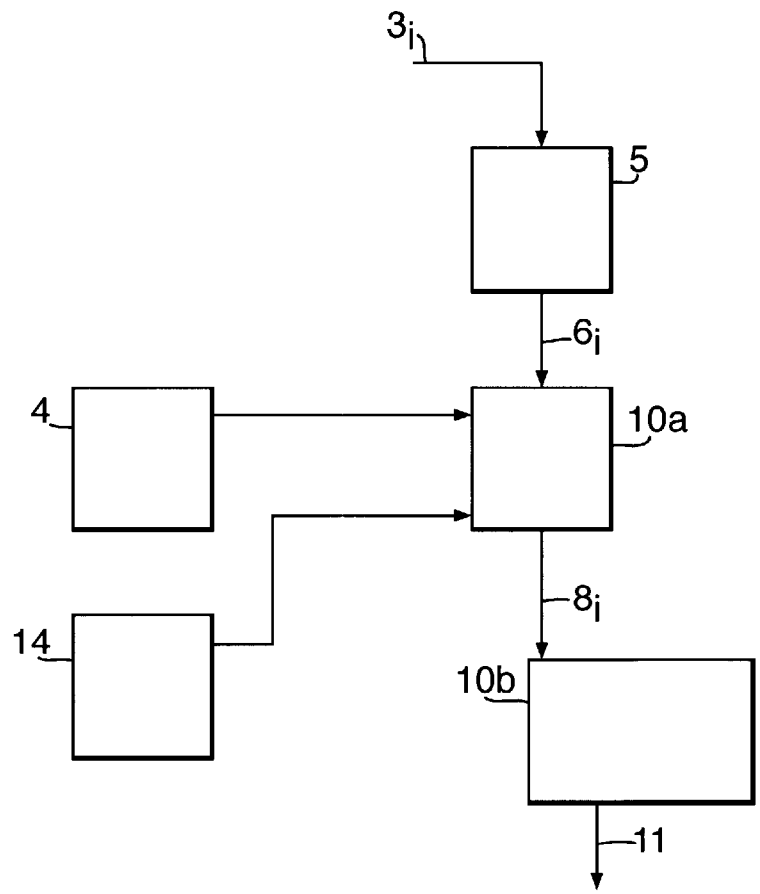
FIG. 2 is a block diagram of a method suitable for use with the apparatus of FIG. 1.

Thus as shown with reference to FIGS. 1 and 2 of the accompanying drawings, a method of the invention for calibrating positions 11 of a plurality of first light sources 1 on a first part 2 when the first lights sources 1 are attached thereto, includes the steps of measuring first positions $3_i$ of the plurality of first light sources 1, each of which first light sources 1 is either an active light source or an illuminable reflecting point, generating a first light source to facet mapping 4, which first light source to facet mapping 4 specifies which facet $9_j$ of the first part 2 the first light sources 1 are located on, and estimating a transformation 5 that transforms the first positions $3_i$ into the co-ordinate frame of reference of the first part 7, thereby generating estimated positions $6_i$ of the first light sources 1 on the first part 2, which estimated positions $6_i$ are in a co-ordinate frame of the first part 7. The method further includes calculating 10a first distances $8_i$ from the estimated positions $6_i$ to respective facets $9_j$ of the first part 2, and optimising the first distances $8_i$ so as to locate the positions 11 of said plurality of first light sources 1 on the first part 2.

Figure 3:
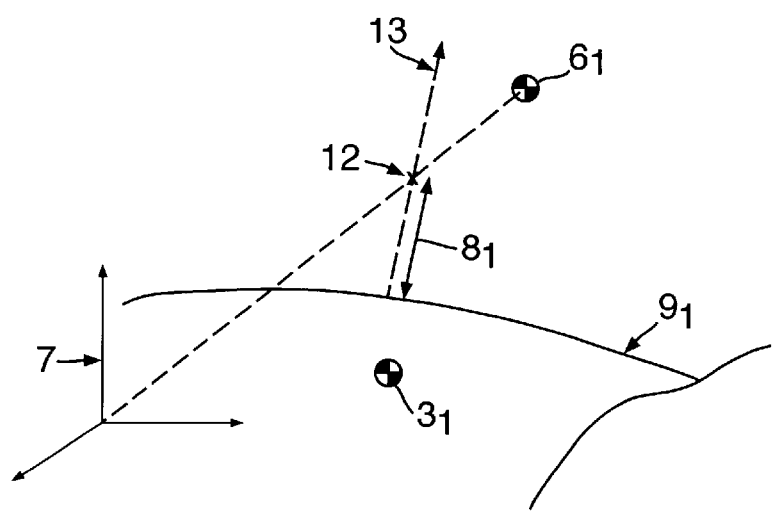
FIG. 3 is a schematic representation of the method of FIG. 1, showing means for calculating first distances.

As shown in FIG. 3, each of the first distances $8_i$ corresponding to each of the plurality of first light sources 1 is given by taking an intersection 12 between a vector normal 13 to the local surface of the corresponding facet $9_j$ and the estimated position $6_i$, which vector normal 13 is derivable from a first data file 14, which is preferably a computer aided design (CAD) model of the first part 2, containing a geometric definition of the first part 2. The first positions $3_i$, mapping means 4, transformation means 5 and first data file 14 are combined to provide the means for calculating first distances $8_i$ in the following manner (for each light source):

Examine the mapping means 4 to find which facet $9_j$ the first light source is located on ($9_x$);

Inspect the first data file 14 to find the equation of the facet of interest $9_x$, then calculate the vector normal 13 to this facet;

Calculate an estimated position of the light source $6_i$ using transformation means 5, which preferably includes matrix multiplication of the first position $3_i$ of the light source with a desired transformation matrix;

Calculate the intersection 12 of the estimated position $6_i$ and the vector normal 13, and calculate the distance $8_i$, from the intersection point 12 to the facet $9_j$, shown in FIG. 2 as occurring at 10a. Once this has been performed for all of the first light sources, the first distances $8_i$ are input to an error minimising function 10b, such as the cost function. The output from this function is a further transformation matrix which will be multiplied with the desired transformation matrix utilised by transformation means 5 in order to reduce the errors output from the error minimising function 10b. This yields positions 11, an array of co-ordinates of the first light sources 1, in the co-ordinate frame of the first part 7.

Figure 4:
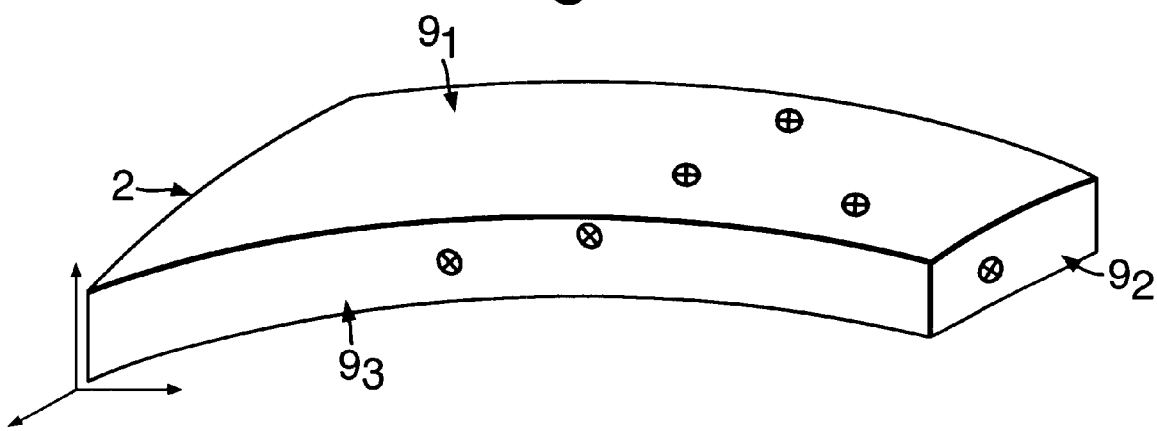
FIG. 4 is a schematic perspective representation of the first part of FIG. 1, showing one arrangement of at least six first light sources positioned on three different facets of the first part.
Figure 5:
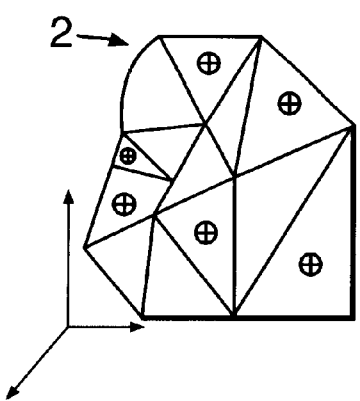
FIG. 5 is a schematic perspective representation of the first part of FIG. 1, showing another arrangement of at least six first light sources positioned on three different facets of the first part.

The above method is dependent on positioning of the first light sources 1 and to avoid a degenerate solution for the positions 11, at least six first light sources 1 should preferably be positioned on facets $9_j$ of the first part with at least three on one facet and three on other facets as shown in FIG. 4, or with each of the six light sources 1 on a different facet, as shown in FIG. 5. The arrangement shown in FIG. 4 includes three first light sources on facet $9_j$, to define the plane of facet $9_1$, two first light sources on facet $9_3$, to set up an axis system relative to the plane of facet $9_1$, and one first light source on facet $9_2$, to distinguish translation directions in a further axis of the plane of facet $9_1$.

The method of the invention, described above, is operable to calibrate positions 11 of a plurality of first light sources 1 on a first part 2 by utilising apparatus of the invention, which apparatus includes measurement means 15, shown in FIG. 1, operable to measure first positions $3_i$ of the plurality of first light sources 1, mapping means 4 for generating a first light source to facet mapping, transformation means 5 for transforming the first positions $3_i$ into the co-ordinate frame of the first part 7, and a first data file 14 stored on a computer readable disk, which first data file 14 is preferably a computer aided design data file, thereby providing a geometric definition of the first part 2. There is also provided a processor 16 for processing first positions $3_i$ measured by the measurement means 15 and for manipulating the same in conjunction with the mapping means 4, the transformation means 5 and the first data file 14, as shown schematically in FIG. 2 and described above.

The measurement means 15 may include an end-effector 17, at least two imaging devices 18a, 18b, each attachable to the end-effector 17 and each configurable to image all facets $9_j$ of the first part 2, and at least two second light sources 19a, 19b, each associated with a respective imaging device 18a, 18b. In place of the end effector 17, imaging devices 18a, 18b could be positioned on tripods (not shown), or a single device 18a could be hand held and measurements made from multiple positions (not shown).

The imaging devices 18a, 18b may be metrology sensors operable to create digitisable images, such that the light projected or reflected from each of the first light sources 1 is reproduced as an image of white pixels against a dark background, which white pixels define a two dimensional spatial location of the first light sources 1 on each of the imaging devices 18a, 18b. These images may be communicated as output signals 20a, 20b by means of communication links 21, also forming part of the measurement means 15, which are preferably coaxial cables, to a processor 13 through framegrabber ports. The imaging devices 18a, 18b could also be cameras, in which case the imaging medium may be a disc or a flashcard, and the information would be extracted therefrom by image processing techniques known in the art.

The plurality of first light sources 1 may be a plurality of reflective targets, each fabricated from retro-reflective material such that light projected by each of the second light sources 19a, 19b is reflected back therefrom in the exact direction of the incident ray and received by the corresponding imaging device 18a, 18b. In order for the method of the invention to calculate a non-degenerate solution, at least six first light sources should be positioned on three different facets $9_1$, $9_2$, $9_3$ of the first part, as shown in FIGS. 4, or each first light source should be positioned on a different facet, as shown in FIG. 5, and as described in the method section above.

What is claimed is:

1. A method for calibrating positions of a first set of light sources on a first part when the first set of light sources are attached thereto at unknown locations, including the steps of:

measuring first positions of the first set of light sources, each of which light sources is either an active light source or an illuminable reflecting point, and matching the first positions to a data file geometrically describing the first part.

2. A method according to claim 1, in which matching of the first positions to a data file geometrically describing the first part includes:

generating a first light source to facet mapping, which first light source to facet mapping specifies which facet of the first part the first set of light sources are located on, estimating a transformation that transforms the first positions into a co-ordinate frame of the first part, thereby generating estimated positions of the first light sources on the first part, calculating first distances from the estimated positions to respective facets of the first part, and optimising the first distances so as to locate the positions of said plurality of first light sources on the first part.

3. A method according to claim 1, in which each of the first distances corresponding to each of the plurality of said first set of light sources is given by taking an intersection between a vector normal to the local surface of the corresponding facet and the estimated position, which vector normal is derivable from a first data file containing a geometric definition of the first part.

4. Apparatus according to claim 1, wherein the first data file is a Computer Aided Design (CAD) model of the first part.

5. Apparatus for calibrating positions of a first set of light sources on a first part when the first set of light sources are attached thereto at unknown locations, said apparatus comprising:

measurement means for measuring first positions of the first set of light sources, and matching means for matching the first positions to a data file geometrically describing the first part.

6. Apparatus according to claim 5, in which the matching means includes:

mapping means for generating a first light source to facet mapping, transformation means for transforming the first positions onto the first part, a first data file stored on a computer readable disk, which first data file provides a geometric definition of the first part, and a processor for processing first positions measured by the measurement means and for manipulating the same in conjunction with the mapping means, the transformation means and the first data file, so as to calibrate the positions of the first set of light sources on a first part when said first set of light sources are attached thereto.

7. Apparatus according to claim 5, wherein the measurement means includes:

an end-effector, at least two imaging devices, each attachable to the end-effector and each configurable to image at least three non-coplanar facets of the first part, at least two second light sources, each of said second light sources associated with a respective imaging device, and communication links between the imaging devices and the processor for transmitting output signals indicative of the first positions.

8. Apparatus according to claim 7, wherein each of the imaging devices is a metrology sensor operable to create digitisable images.

9. Apparatus according to claim 8, wherein each of the first set of light sources is a reflective target.

10. Apparatus according to claim 9 wherein there are at least six first light sources positioned on three different facets of the first part.

* * * * *